(12) United States Patent
Guo et al.

(10) Patent No.: US 10,340,507 B2
(45) Date of Patent: Jul. 2, 2019

(54) METHOD OF PREPARING AND APPLICATION OF CARBON SELENIUM COMPOSITES

(71) Applicants: Institute of Chemistry, Chinese Academy of Sciences, Beijing (CN); II-VI Incorporated, Saxonburg, PA (US)

(72) Inventors: Yu-Guo Guo, Beijing (CN); Shuaifeng Zhang, Beijing (CN); Yaxia Yin, Beijing (CN)

(73) Assignees: Institute of Chemistry, Chinese Academy of Sciences, Beijing (CN); II_VI Incorporated, Saxonburg, PA (US)

( * ) Notice: Subject to any disclaimer, the term of this patent is extended or adjusted under 35 U.S.C. 154(b) by 216 days.

(21) Appl. No.: 15/262,407

(22) Filed: Sep. 12, 2016

(65) Prior Publication Data

US 2017/0084908 A1 Mar. 23, 2017

(30) Foreign Application Priority Data

Sep. 22, 2015 (CN) .......................... 2015 1 0608018

(51) Int. Cl.
*H01M 4/134* (2010.01)
*H01M 4/36* (2006.01)
(Continued)

(52) U.S. Cl.
CPC ......... *H01M 4/134* (2013.01); *H01M 4/1395* (2013.01); *H01M 4/362* (2013.01);
(Continued)

(58) Field of Classification Search
CPC ..... H01M 4/134; H01M 4/1395; H01M 4/362
See application file for complete search history.

(56) References Cited

U.S. PATENT DOCUMENTS

| 2011/0223487 A1* | 9/2011 | Johnson | ............. | H01M 4/0471 |
| | | | | 429/319 |
| 2012/0225352 A1* | 9/2012 | Abouimrane | ............ | H01B 1/18 |
| | | | | 429/211 |

(Continued)

FOREIGN PATENT DOCUMENTS

| CN | 101740231 A | 6/2010 |
| CN | 102078816 A | 6/2011 |

(Continued)

OTHER PUBLICATIONS

Machine translation of CN 104201349.*

(Continued)

*Primary Examiner* — Jonathan G Jelsma
(74) *Attorney, Agent, or Firm* — The Webb Law Firm

(57) ABSTRACT

Disclosed is method of preparing a selenium carbon composite material and a use of the selenium carbon composite material in a cathode of a lithium selenium secondary battery. A battery formed with a cathode of the disclosed selenium carbon composite material has high energy density and stable electrochemical performance. The disclosed selenium carbon composite material can effectively shorten the migration distance of lithium ions during charging and discharging of the battery and improve conductivity and utilization of selenium after compounding carbon and selenium. Multiple batteries formed with cathodes of the disclosed selenium carbon composite material can be assembled into a lithium selenium pouch-cell battery having stable electrochemical performance and high energy density.

14 Claims, 5 Drawing Sheets

(51) Int. Cl.
- H01M 4/38 (2006.01)
- H01M 4/1395 (2010.01)
- H01M 4/62 (2006.01)
- H01M 2/16 (2006.01)
- H01M 10/052 (2010.01)

(52) U.S. Cl.
CPC .............. *H01M 4/38* (2013.01); *H01M 4/625* (2013.01); *H01M 2/1653* (2013.01); *H01M 10/052* (2013.01)

(56) References Cited

U.S. PATENT DOCUMENTS

| | | |
|---|---|---|
| 2015/0064575 A1 | 3/2015 | He et al. |
| 2016/0020491 A1 | 1/2016 | Dai et al. |

FOREIGN PATENT DOCUMENTS

| | | |
|---|---|---|
| CN | 103187559 A | 7/2013 |
| CN | 103332688 A | 10/2013 |
| CN | 104201349 A | 12/2014 |
| CN | 104201389 A | 12/2014 |
| CN | 104393304 A | 3/2015 |
| CN | 104733677 A | 6/2015 |

OTHER PUBLICATIONS

Jiang et al., "Selenium encapsulated into 3D interconnected hierarchical porous carbon aerogels for lithium-selenium batteries with high rate performance and cycling stability", Journal of Power Sources, Jun. 2, 2014 (online), pp. 394-404, vol. 267.

Sevilla et al., "A general and facile synthesis strategy towards highly porous carbons: Carbonization of organic salts", Journal of Materials Chemistry A, Oct. 14, 2013 (online), 10 pages, vol. 1.

Li et al., "MOF-derived, N-doped, hierarchically porous carbon sponges as immobilizers to confine selenium as cathodes for Li-Se batteries with superior storage capacity and perfect cycling stability", Nanoscale, 2015, pp. 9597-9606, vol. 7.

Abouimrane et al., "A New Class of Lithium and Sodium Rechargeable Batteries Based on Selenium and Selenium-Sulfur as a Positive Electrode", Journal of American Chemical Society, 2012, pp. 4505-4508, vol. 134.

Liu et al., "Enhanced electrochemical performances of mesoporous carbon microsphere/selenium composites by controlling the pore structure and nitrogen doping", Electrochimica Acta, 2015, pp. 140-148, vol. 153.

Li et al., "A New Salt-Baked Approach for Confining Selenium in Metal Complex-Derived Porous Carbon with Superior Lithium Storage Properties", Advanced Functional Materials, 2015, pp. 5229-5238, vol. 25.

Chen et al., "Graphene-Based Three-Dimensional Hierarchical Sandwich-type Architecture for High-Performance Li/S Batteries", American Chemical Society, 2013, pp. 4642-4649, vol. 13.

Han et al., "A Free-Standing and Ultralong-life Lithium-Selenium Battery Cathode Enabled by 3D Mesoporous Carbon/Graphene Hierachical Architecture", Adv. Funct. Mater., 2015, pp. 455-463, vol. 25.

Lee et al., "Micro- and Mesoporous Carbide-Derived Carbon-Selenium Cathodes for High-Performance Lithium Selenium Batteries", Adv. Energy Mater., 2014, pp. 1-7.

Wu et al., "High-Performance Lithium Selenium Battery with Se/Microporous Carbon Composite Cathode and Carbonate-Based Electrolyte", Science China Materials, 2015, pp. 91-97, vol. 58.

Ye et al., "Advanced Se-C Nanocomposites: a Bifunctional Electrode Material for both Li-Se and Li-ion Batteries", J. Mater. Chem. A., 2014, pp. 1-6.

Wu et al., "Lithium Iodide as a Promising Electrolyte Additive for Lithium-Sulfur Batteries: Mechanisms of Performance Enhancement", Adv. Mater., 2015, pp. 101-108, vol. 27.

Liu et al., "A Se/C Composite as Cathode Material for Rechargeable Lithium Batteries with Good Electrochemical Performance", RSC Advances, 2014, pp. 9086-9091, vol. 4.

Yang et al., "Elemental Selenium for Electrochemical Energy Storage", J. Phys. Chem. Lett., 2015, pp. 256-266, vol. 6.

Luo et al., "Selenium@mesoporous Carbon Composite with Superior Lithium and Sodium Storage Capacity", ACSNANO, 2013, pp. 8003-8010, vol. 7, No. 9.

* cited by examiner

METHOD OF PREPARING AND APPLICATION OF CARBON SELENIUM COMPOSITES

CROSS-REFERENCE TO RELATED APPLICATION

This application claims priority to Chinese Patent Application No. 201510608018 filed Sep. 22, 2015 the disclosure of which is hereby incorporated in its entirety by reference.

BACKGROUND OF THE INVENTION

Field of the Invention

The present invention relates to the field of lithium secondary batteries of high energy density, particularly relates to a novel preparation method of carbon-selenium nanocomposite materials and their applications.

Description of Related Art

With the increasing human demand for energy, secondary batteries with high energy density and high volume energy density, such as lithium-sulfur batteries and lithium-selenium batteries, have attracted widespread interests. Group 6A elements in the periodical table, such as sulfur and selenium, have shown two-electron reaction mechanisms in the electrochemical reaction process with lithium. Despite the theoretical mass energy specific capacity of selenium (675 mAh/g) is lower than that of sulfur (1675 mAh/g), selenium has a higher density (4.82 $g/cm^3$) than sulfur (2.07 $g/cm^3$); therefore the theoretical volume energy density of selenium (3253 $mAh/cm^3$) is close to the theoretical volumetric energy density of sulfur (3467 $mAh/cm^3$). At the same time, as compared with sulfur, close to an electrically insulated material, selenium is semi-conductive electrically and shows better electrically conductive property. Therefore, as compared to sulfur, selenium can demonstrate a higher level of activity and better utilization efficiency even at a higher loading level, leading to high surface density battery systems. Moreover, selenium-carbon composite can have a further improvement in the electrical conductivity over sulfur-carbon composite to obtain a higher activity electrode material. As described in the patent CN104393304A, by passing hydrogen selenide gas through graphene dispersion solution, the solvent heat reduces the graphene oxide into graphene while oxidized the hydrogen selenide into selenium. The such prepared selenium graphene electrode materials pairs with ethers electrolyte system, 1.5M lithium bi-trifluoromethane sulfonimide (LiTFSI)/1,3-dioxolane (DOL)+dimethyl ether (DME) (Volume ratio 1:1); the charging specific capacity reaches 640 mAh/g (approaching selenium theoretical specific capacity) in the first cycle. But in the charge-discharge process, polyselenide ions dissolve in the electrolyte, showing significant amounts of the shuttling effect, which causes the subsequent capacity delay. At the same time, the procedures for preparing the graphene oxide raw material that is used in this process are complicated, not suitable for industrial production. CN104201389A patent discloses a lithium-selenium battery cathode material, utilizing a nitrogen-containing layered porous carbon component current-collector which was compounded with selenium. In preparing nitrogen-containing layered porous carbon composite current collector, nitrogen-containing conductive polymer is first deposited or grown on the surface of a piece of paper, followed by alkali activation and high temperature carbonization, resulting in a nitrogen-containing layered porous carbon composite current collector with carbon fiber as network structure that supports itself; and such nitrogen-containing layered porous carbon composite current collector is then further compounded with selenium. The deposition method for preparing a conductive polymer is complicated and the process for film formation or growth is hard to control. The preparation process is complicated, which associates with undesirably high costs.

SUMMARY OF THE INVENTION

The present invention uses one-step process to prepare a two-dimensional carbon nanomaterial, which has a high degree of graphitization; the two-dimensional carbon nanomaterials are compounded with selenium to obtain a carbon-selenium composite material, which is used as a cathode material that pairs with anode material containing lithium, resulting in a lithium-selenium battery that has a high energy density and stable electrochemical performances. Similar procedures were used to further assemble a pouch cell, which also demonstrates excellent electrochemical properties.

The object of the present invention is to provide a method to prepare selenium-carbon composite material with readily available raw materials and simple preparation procedures.

Selenium-carbon composite material descripted the present invention is obtained from the preparation method that comprises the following steps:

(1) Carbonize alkali metal organic salts or alkaline earth metal organic salts in high temperature, and then wash with dilute hydrochloric acid, and dry to obtain a two-dimensional carbon material;

(2) Mix the two-dimensional carbon material obtained in step (1) with a selenium organic solution, heat and evaporate the organic solvent, and then achieve compounding selenium with the two-dimensional carbon material through a multi-stage heat ramping and soaking procedure to obtain carbon-selenium composite.

Wherein, in the step (1), the alkali metal organic salt is selected from one or several of potassium citrate, potassium gluconate, sucrose acid sodium. The alkaline earth metal organic salt is selected from one or both of calcium gluconate, sucrose acid calcium. The high temperature carbonization is performed at 600-1000° C., preferably, 700-900° C.; carbonation time for 1-10 hours, preferably for 3-5 hours.

Wherein, step (2) of the organic solvent is selected from one or several of ethanol, dimethylsulfoxide (DMSO), toluene, acetonitrile, N,N-dimethylformamide (DMF), carbon tetrachloride, diethyl ether or ethyl acetate; multi-heat ramping & soaking section is referred as to a ramping rate 2-10° C./min, preferably 5-8° C./min, to a temperature between 200 and 300° C., preferably between 220 and 280° C., followed by soaking at the temperature for 3-10 hours, preferably, 3-4 hours; then continue to heat up to 400° C.-600° C., preferably, 430-460° C., followed by soaking for 10-30 hours, preferably 15-20 hours.

Another object of the present invention is to provide a lithium-selenium secondary battery that comprises the carbon-selenium composite materials. The said selenium lithium secondary battery further comprises: a lithium-containing anode, a separator, and an electrolyte.

Among them, lithium-containing anode may be one or several of lithium metal, a lithiated graphite anode, lithiated silicon carbon anode materials (through assembling the graphite and silicon-carbon anode materials and lithium anode into half battery, discharge, to prepare lithiated graphite anode and lithiated silicon carbon anode materials). The separator (membrane) is one of the commercial celgard member, Whatman member, cellulose membrane, a polymer membrane. The electrolyte is one or several of the carbonate electrolyte, ether electrolyte, and ionic liquids. Carbonate electrolyte is selected from one or several from diethyl carbonate ester (DEC), dimethyl carbonate (DMC), ethylene carbonate (EC), ethyl methyl carbonate (EMC), and propylene carbonate (PC). The solute is selected from one or several from lithium hexafluoro phosphate (LiPF6), lithium bis (trifluoromethanesulfonyl) imide (LiTFSI), lithium perchlorate (LiClO4) and lithium bis(fluorosulfonyl) imide (LiFSI). In ether electrolytic solution, the solvent is selected one or several from 1,3-dioxolane (DOL), ethylene glycol dimethyl ether (DME) and triethylene glycol dimethyl ether (TEGDME); solute is selected in one or more from lithium hexafluorophosphate (LiPF6), lithium bis-(trifluoromethanesulfonyl) imide (LiTFSI), lithium perchlorate (LiClO4) and lithium bis-fluorosulfonylimide (LiFSI). For ionic liquids, the Ionic liquid is one or more from room temperature ionic liquid [EMIm] NTf2 (1-ethyl-3-methylimidazolium bis trifluoromethane sulfonimide salt), [Py13] NTf2 (N-Propyl-N-methylpyrrolidine bis trifluoromethane sulfonimide salt, [PP13] (N-propyl-methylpiperidine alkoxy-N-Bis trifluormethane sulfonimide salts); solute is selected in one or more from lithium hexafluorophosphate (LiPF6), bis)trilfuormethylsulfonyl) imide (LiTFSI), lithium perchlorate (LiClO4) and lithium bis fluorosulfonylimide (LiFSI).

The present invention also provides a pouch-cell lithium-selenium battery containing the carbon selenium composite material.

Compared with prior art, with respect to the method for preparing selenium carbon composite material in the present invention, the two-dimensional carbon material is not only of the advantages in that the raw materials are readily available and low cost, and preparation method is simple, highly practical and suitable for mass production, but also the obtained selenium carbon composite material exhibits excellent electrochemical properties.

DESCRIPTION OF THE INVENTION

In conjunction with the specific examples, the present will be further described below. Unless otherwise specified, the experimental methods in the following examples are all conventional; the reagents and materials are all available from commercial sources.

EXAMPLE 1

(A) Preparation of Selenium Carbon Composite Material

Figure 1:
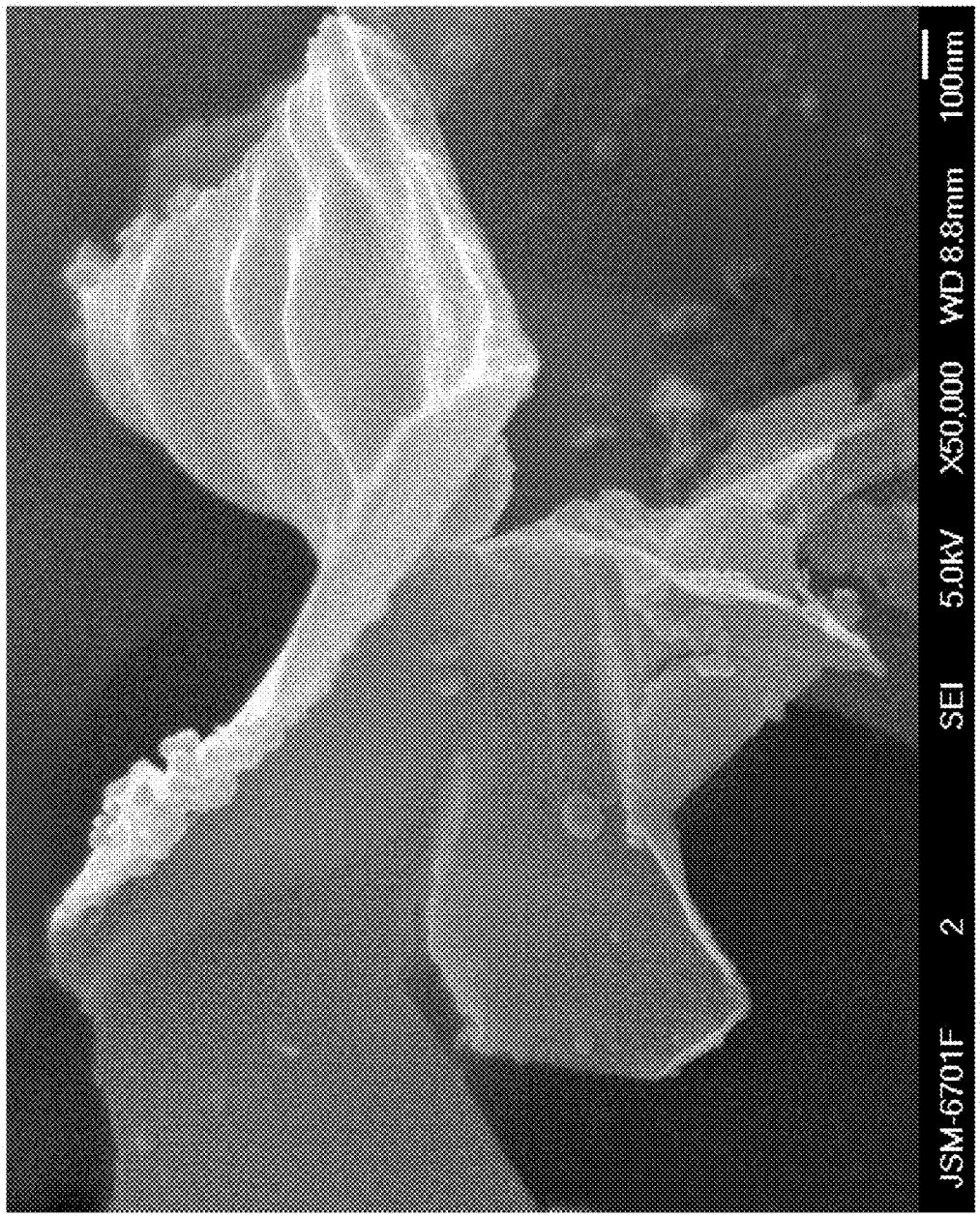
FIG. 1 is a 50,000× scanning electron microscope photograph for carbon material in the example 1.

After grinding and milling, an appropriate amount of potassium citrate is calcined at 800° C. for 5 hours under an inert atmosphere, and cooled to room temperature. Washed with dilute hydrochloric acid to a neutral pH; filtered and dried to give a two-dimensional carbon nanomaterial (FIG. 1); according to the mass ratio of 50:50, weigh the two dimensional carbon material and selenium, and then stir and mix with the ethanol solution of selenium uniformly; after solvent evaporation, dry the mixture in dry oven; the dried mixture was heated at 5° C./min to 240° C. and soaked for 3 hours; then continues to heat up at 5° C./min to 450° C.; soaked for 20 hours; cooled to room temperatures, which resulted in the selenium carbon composite material.

(B) Preparation of the Cathode Tab

The above-prepared selenium carbon composites are mixed with carbon black Super-P and binder CMC/SBR (1:1) along with water by a fixed proportions by pulping, coating, drying and other procedures to obtain selenium carbon composite cathode.

(C) Assembling Lithium-selenium Battery

Figure 4:
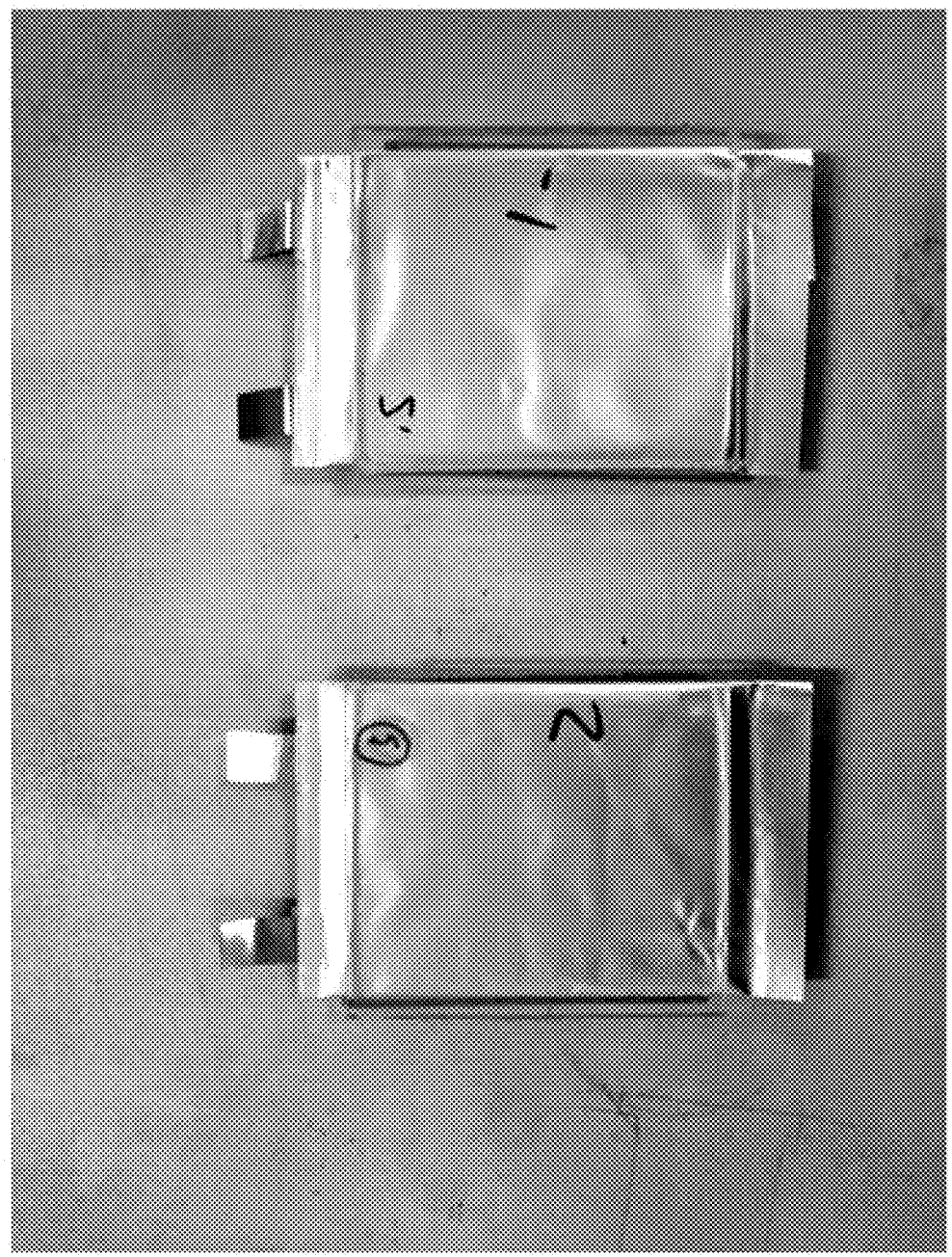
FIG. 4 is an optical image of the pouch-cell battery case in the example 1.

The above-prepared selenium carbon composite cathode, lithium foil as anode, celgard diaphragm as separator and 1M LiPF6 in EC/DMC as the electrolyte were assembled into a lithium selenium button cell battery and lithium selenium pouch-cell battery (FIG. 4).

(D) Lithium-selenium Battery Test

Figure 2:
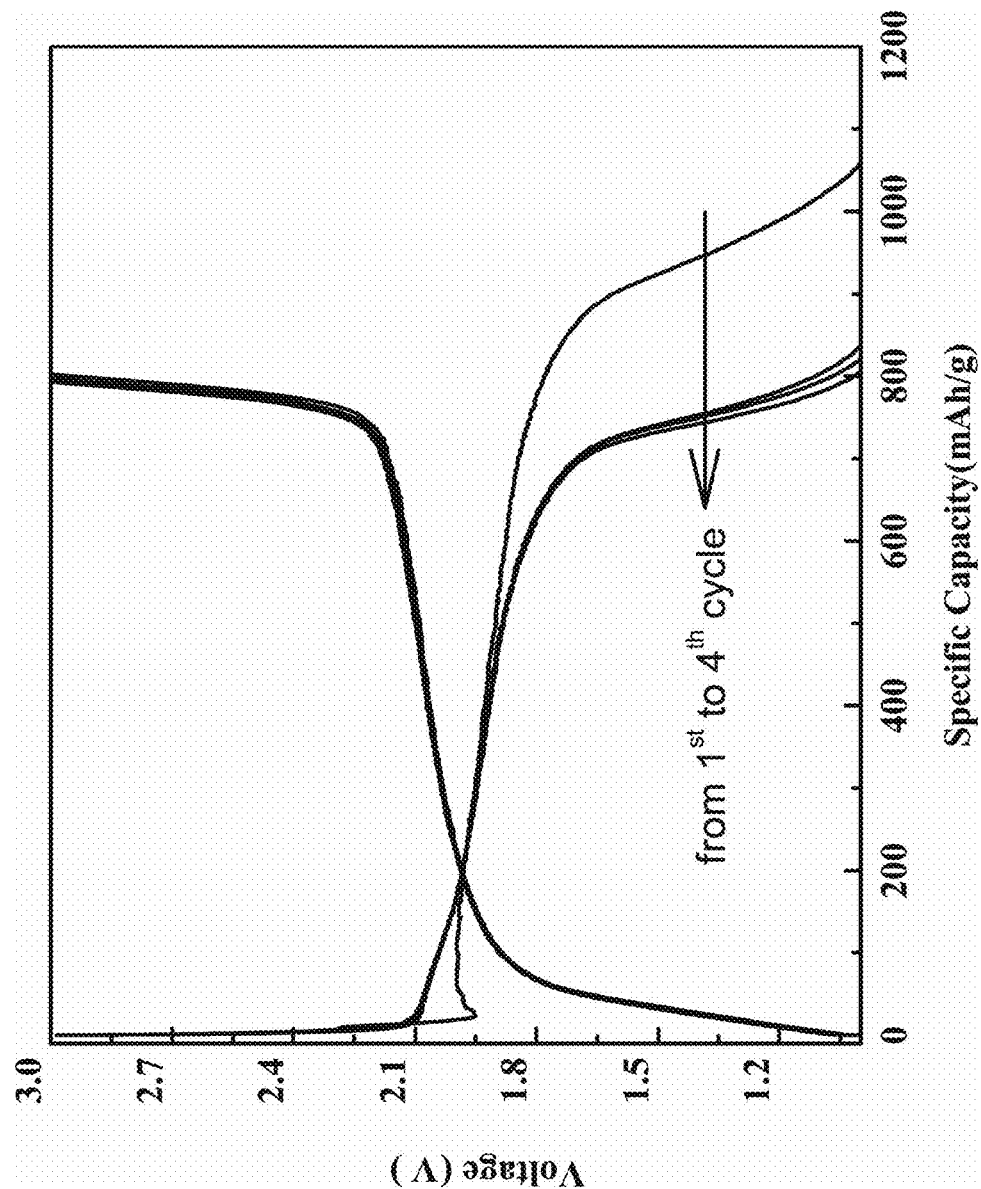
FIG. 2 is a 0.1 C charge and discharge curve of the lithium selenium battery in the example 1.
Figure 5:
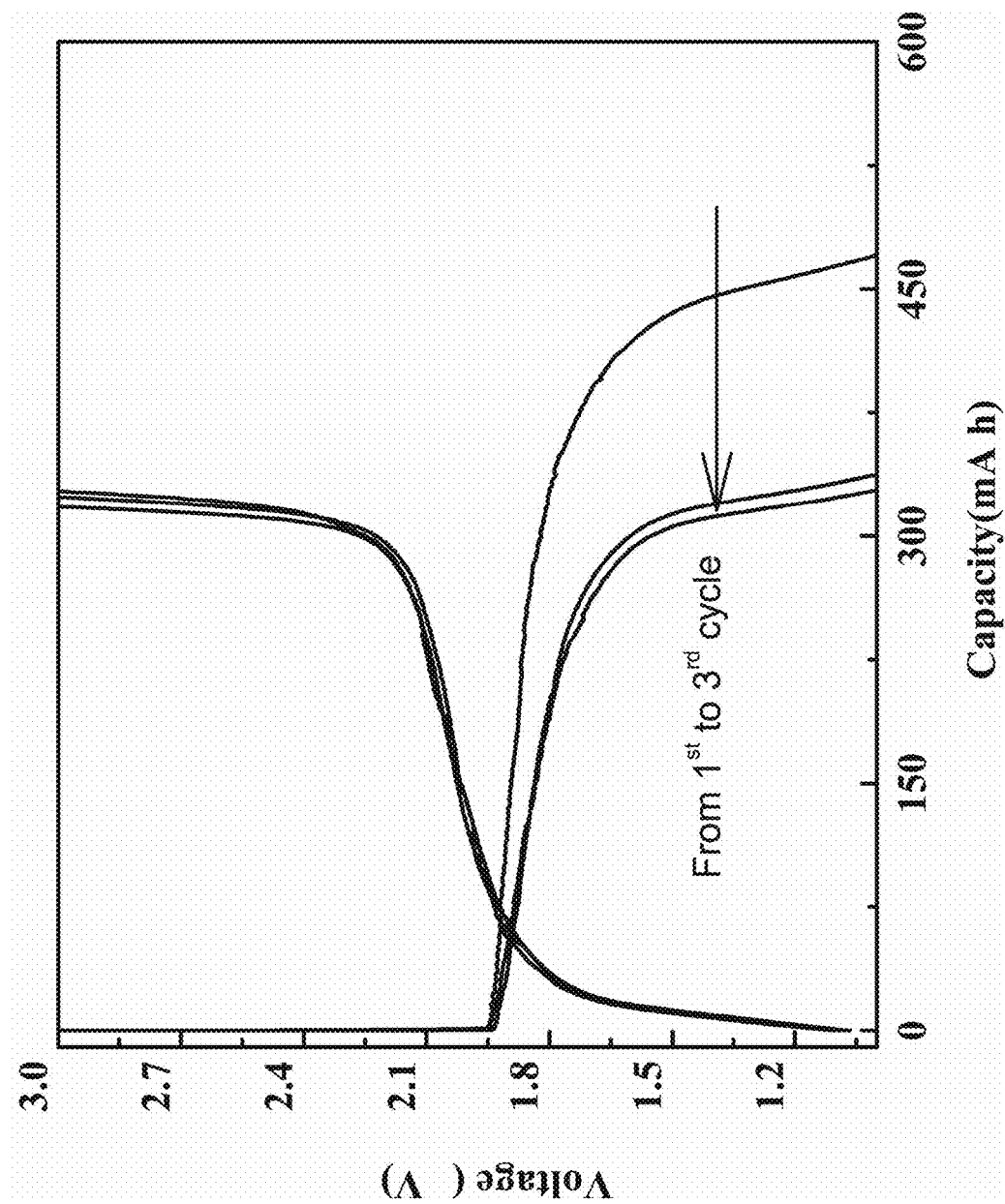
FIG. 5 is a 0.05 C charge and discharge curve of the pouch-cell battery case in the example 1.

Use a charge-discharge apparatus to do constant current charge-discharge test on the said lithium-selenium button cell battery and lithium selenium pouch-cell battery. Test voltage range is between 1.0 and 3.0 V and test temperature is 25° C. Discharge specific capacity and the level of charge-discharge current are standardly calculated based on the mass of selenium. The charge-discharge current is 0.1 C or 0.05 C. Lithium selenium button coin battery charge and discharge curve is shown in FIG. 2, the specific test results are shown in Table 1. Lithium selenium pouch-cell battery test results are shown in FIG. 5.

EXAMPLE 2

Other experimental conditions are same as in Example 1; only exception is that the raw material carbonized for two-dimensional carbon is sodium citrate. Battery Test results are summarized in Table 1 below.

EXAMPLE 3

Other experimental conditions are same as in Example 1; only exception is that the raw material carbonized for two-dimensional carbon is potassium gluconate. Battery Test results are summarized in Table 1 below.

EXAMPLE 4

Other experimental conditions are same as in Example 1; only exception is that the high-temperature carbonization temperature for the carbon material is 650° C. Battery Test results are summarized in Table 1 below.

EXAMPLE 5

Other experimental conditions are same as in Example 1; only exception is that the dried mixture was heated at 5° C./min to 300° C. and soaked at this temperature for 3 hours. Battery Test results are summarized in Table 1 below.

EXAMPLE 6

Other experimental conditions are same as in Example 1; only exception is that the dried mixture was heated at 5° C./min to 240° C. and soaked at this temperature for 3 hours, then continued to heat up to 600° C., and soaked at this constant temperature for 20 hours. Battery Test results are summarized in Table 1 below.

EXAMPLE 7

Other experimental conditions are same as in Example 1; only exception is that the lithium-Se battery is packed with lithiated graphite anode, instead of the lithium anode sheet. Battery Test results are summarized in Table 1 below.

EXAMPLE 8

Other experimental conditions are same as in Example 1; only exception is that the lithium-Se battery is packed with lithiated silicon carbon anode, instead of the lithium anode sheet. Battery Test results are summarized in Table 1 below.

COMPARATIVE EXAMPLE 1

Other experimental conditions are the same as in Example 1; only exception is that the use of polyacrylonitrile as the raw material. Battery Test results are summarized in Table 1 below.

COMPARATIVE EXAMPLE 2

Figure 3:
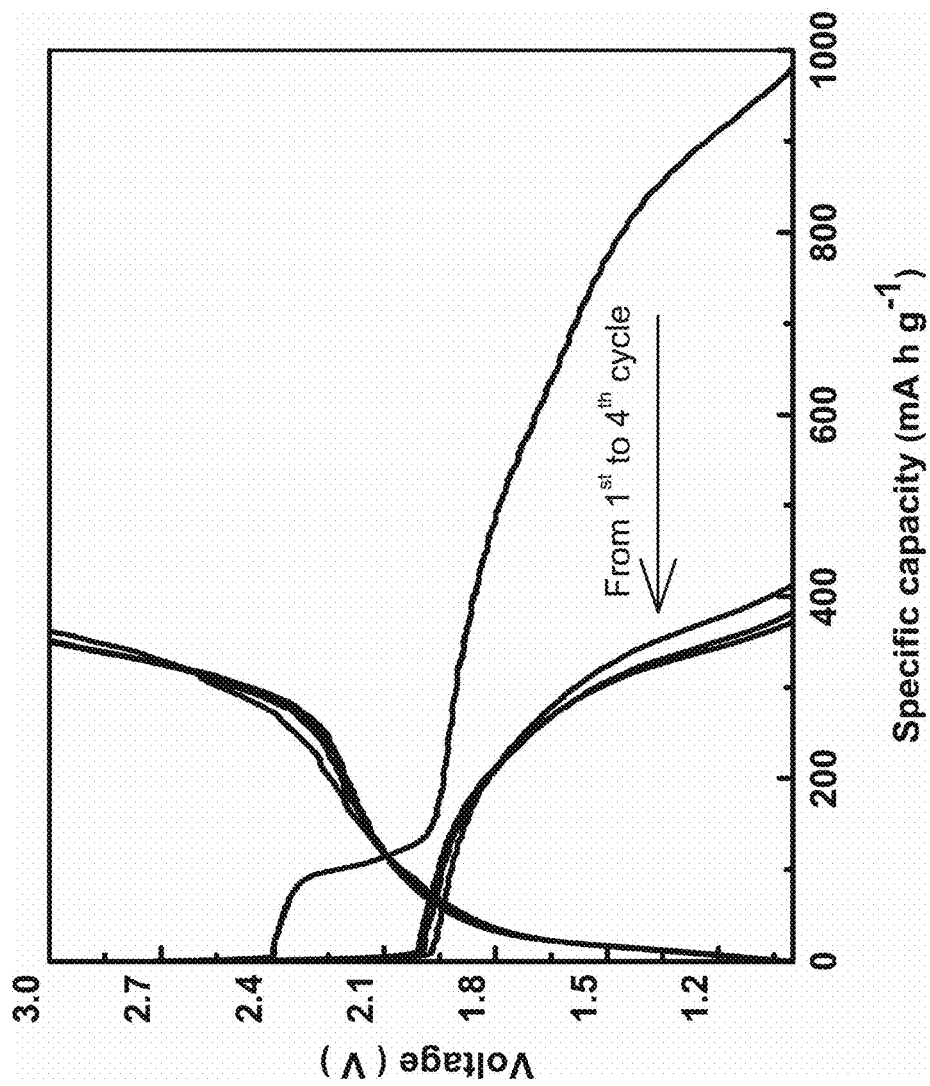
FIG. 3 is a 0.1 C charge and discharge curve of the lithium selenium battery in the comparative example 2.

Other experimental conditions are the same as in Example 1; only exception is that using one-step compound method to prepare selenium and carbon composite. The dried selenium carbon mixture was heated at 5° C./min to 500° C. and soaked at this temperature for 23 hours to obtain selenium carbon composite material. The charge-discharge curve of a battery made from the thus obtained selenium carbon composite material is shown in FIG. 3; the battery test results are summarized in Table 1 below.

TABLE 1 summarized Battery Test Results

| Numbering | The first cycle discharge capacity (MAh/g) | the first cycle Coulomb efficiency (%) | After cycling 50 laps capacity (MAh/g) |
|---|---|---|---|
| Example 1 | 1,050 | 78.1 | 756 |
| Example 2 | 940 | 74.6 | 672 |
| Example 3 | 962 | 75.3 | 683 |
| Example 4 | 987 | 72.1 | 680 |
| Example 5 | 936 | 73.2 | 653 |
| Example 6 | 972 | 70 | 661 |
| Example 7 | 836 | 72.5 | 580 |
| Example 8 | 910 | 73 | 600 |
| Comparative Example 1 | 635 | 55 | 350 |
| Comparative Example 2 | 980 | 40.8 | 386 |

Above examples are only for the illustration of the embodiments of the present invention, which by no means is to be used in any form as a limit to the scope of the present invention. Although the present invention has been revealed above as the preferred embodiments, it is not intended to limit the present invention. Anybody with skills in the art can use the revealed technical content by making little changes or substitutions, without departing from the scope of the technical aspect of the present invention, as described above, to derive equivalent of examples of the present invention. But those that do not depart from the nature of the present invention by simple modification of any of the above embodiments or by making equivalent variations and modifications based on the technical nature of the present invention, would fall within the scope of the present invention of the technical solutions.

The invention claimed is:

1. A method of preparing a selenium carbon composite material, comprising:
    (a) carbonizing an alkali metal organic salt or an alkaline earth metal organic salt at high temperature, washing with an acid, and drying to obtain a two-dimensional carbon nanomaterial;
    (b) mixing the two-dimensional carbon material obtained in step (a) with an organic solvent and selenium, heating the mixture to evaporate the organic solvent, and then going through multistage heat ramping and soaking processes to achieve the two-dimensional selenium carbon composite material.

2. The method according to claim 1, wherein, in step (a):
    the alkali metal organic salt is selected from one or several of potassium citrate, potassium gluconate, and sucrose acid sodium;
    the alkaline earth metal organic salt is selected from one or both of calcium gluconate and sucrose acid calcium; and
    carbonization is performed at 600° C.-1000° C. for 1-10 hours.

3. The method according to claim 1, wherein, in step (b):
    the organic solvent is selected from one or several of ethanol, dimethylsulfoxide (DMSO), toluene, acetonitrile, N,N-dimethylformamide (DMF), carbon tetrachloride, diethyl ether or ethyl acetate;
    the multistage-heat ramping and soaking process includes: heating 2° C.-10° C./min to 200° C.-300° C. and soaking for 3-10 hours; and
    continue to heating to 400° C.-600° C. and soaking for 10-30 hours.

4. The method of claim 1, wherein the acid is hydrochloric acid.

5. The method according to claim 1, wherein, in step (a):
    the alkali metal organic salt is selected from one or several of potassium citrate, potassium gluconate, and sucrose acid sodium;
    the alkaline earth metal organic salt is selected from one or both of calcium gluconate and sucrose acid calcium; and
    carbonization is performed at 700° C.-900° C.

6. The method according to claim 1, wherein, in step (b):
    the organic solvent is selected from one or several of ethanol, dimethylsulfoxide (DMSO), toluene, acetonitrile, N,N-dimethylformamide (DMF), carbon tetrachloride, diethyl ether or ethyl acetate; and
    the multistage-heat ramping and soaking process includes: heating to 220° C.-280° C. and soaking at 220° C.-280° C.

7. A method of preparing a selenium carbon composite material, comprising:
    (a) carbonizing an alkali metal organic salt or an alkaline earth metal organic salt at a temperature ≥600° C.;
    (b) washing the carbonized salt of step (a) with an acid;
    (c) drying the washed carbonized salt of step (b) to obtain a two-dimensional carbon nanomaterial;
    (d) mixing the two-dimensional carbon nanomaterial of step (c) with selenium and an organic solvent;
    (e) heating the mixture of step (d) to evaporate the organic solvent; and (f) subjecting the organic solvent evaporated mixture of step (e) to a multistage heat ramping and soaking process to achieve a two-dimensional selenium carbon composite material.

8. The method of claim 7, wherein in step (d) the two-dimensional carbon nanomaterial of step (c) is mixed with an organic solution of selenium and the organic solvent.

9. The method of claim 7, wherein:
the alkali metal organic salt is one or more of potassium citrate, potassium gluconate, and sucrose acid sodium; or
the alkaline earth metal organic salt is one or both of calcium gluconate and sucrose acid calcium; or
step (a) is performed at 600° C.-1000° C.; or
step (a) is performed for 1-10 hours.

10. The method of claim 7, wherein:
the organic solvent of step (d) is an organic solvent comprised of one or more of ethanol, dimethylsulfoxide (DMSO), toluene, acetonitrile, N,N-dimethylformamide (DMF), carbon tetrachloride, diethyl ether, and ethyl acetate; and
the multistage heat ramping and soaking process of step (f) includes:
(1) increasing the temperature by 2° C.-10° C./min to a temperature of 200° C.-300° C.;
(2) following step (1), soaking at the temperature of step (1) for 3-10 hours;
(3) following step (2), increasing the temperature to 400° C.-600° C.; and
(4) following step (3), soaking at the temperature of step (3) for 10-30 hours.

11. The method of claim 7, wherein the acid is hydrochloric acid.

12. The method of claim 7, wherein:
the alkali metal organic salt is one or more of potassium citrate, potassium gluconate, and sucrose acid sodium; or
the alkaline earth metal organic salt is one or both of calcium gluconate and sucrose acid calcium; or
step (a) is performed at 700° C.-900° C.

13. The method of claim 7, wherein:
the organic solvent of step (d) is an organic solvent comprised of one or more of ethanol, dimethylsulfoxide (DMSO), toluene, acetonitrile, N,N-dimethylformamide (DMF), carbon tetrachloride, diethyl ether, and ethyl acetate; and
the multistage heat ramping and soaking process of step (f) includes:
(1) increasing the temperature to 220° C.-280° C.; and
(2) following step (1), soaking at the temperature of step (1).

14. The method of claim 13, wherein the multistage heat ramping and soaking process of step (f) includes:
(3) following step (2), increasing the temperature to 430° C.-460° C.; and
(4) following step (3), soaking at the temperature of step (3).

* * * * *

UNITED STATES PATENT AND TRADEMARK OFFICE
CERTIFICATE OF CORRECTION

PATENT NO. : 10,340,507 B2
APPLICATION NO. : 15/262407
DATED : July 2, 2019
INVENTOR(S) : Yu-Guo Guo et al.

It is certified that error appears in the above-identified patent and that said Letters Patent is hereby corrected as shown below:

On the Title Page

Item (73), delete "II_VI" and insert -- II-VI --

Signed and Sealed this
First Day of October, 2019

Andrei Iancu
*Director of the United States Patent and Trademark Office*